United States Patent [19]

Vigneaux

[11] Patent Number: 4,503,712
[45] Date of Patent: Mar. 12, 1985

[54] MASS FLOWMETER

[75] Inventor: Pierre Vigneaux, Maincy, France

[73] Assignee: Schlumberger Technology Corporation, New York, N.Y.

[21] Appl. No.: 472,422

[22] Filed: Mar. 4, 1983

[30] Foreign Application Priority Data

Mar. 5, 1982 [FR] France ................................ 82 04141

[51] Int. Cl.³ .............................................. G01F 1/78
[52] U.S. Cl. .............................. 73/861.35; 73/861.71; 73/861.89
[58] Field of Search ........... 73/861.35, 861.71, 861.75, 73/861.83, 861.89, 861.74

[56] References Cited

U.S. PATENT DOCUMENTS

| 2,943,487 | 7/1960 | Potter | 73/861.35 |
| 3,465,586 | 9/1969 | Johnston | 73/861.71 |
| 3,555,900 | 1/1971 | Bauer et al. | |
| 3,604,265 | 9/1971 | Wilson et al. | |
| 3,613,451 | 10/1971 | Scott | 73/861.35 |
| 4,250,745 | 2/1981 | Blatter et al. | 73/861.74 |

FOREIGN PATENT DOCUMENTS 189170 12/1966 U.S.S.R. .

Primary Examiner—Herbert Goldstein

[57] ABSTRACT

Apparatus for measuring mass rate of flow of fluid has a fluid driven turbine including a bladed rotor mounted in a conduit through which the fluid flows. The rotor blades are elastically deformable under the action of the flowing fluid and the angles of inclination a and b of successive blades are different. Sensors are provided to measure blade deformation.

14 Claims, 6 Drawing Figures

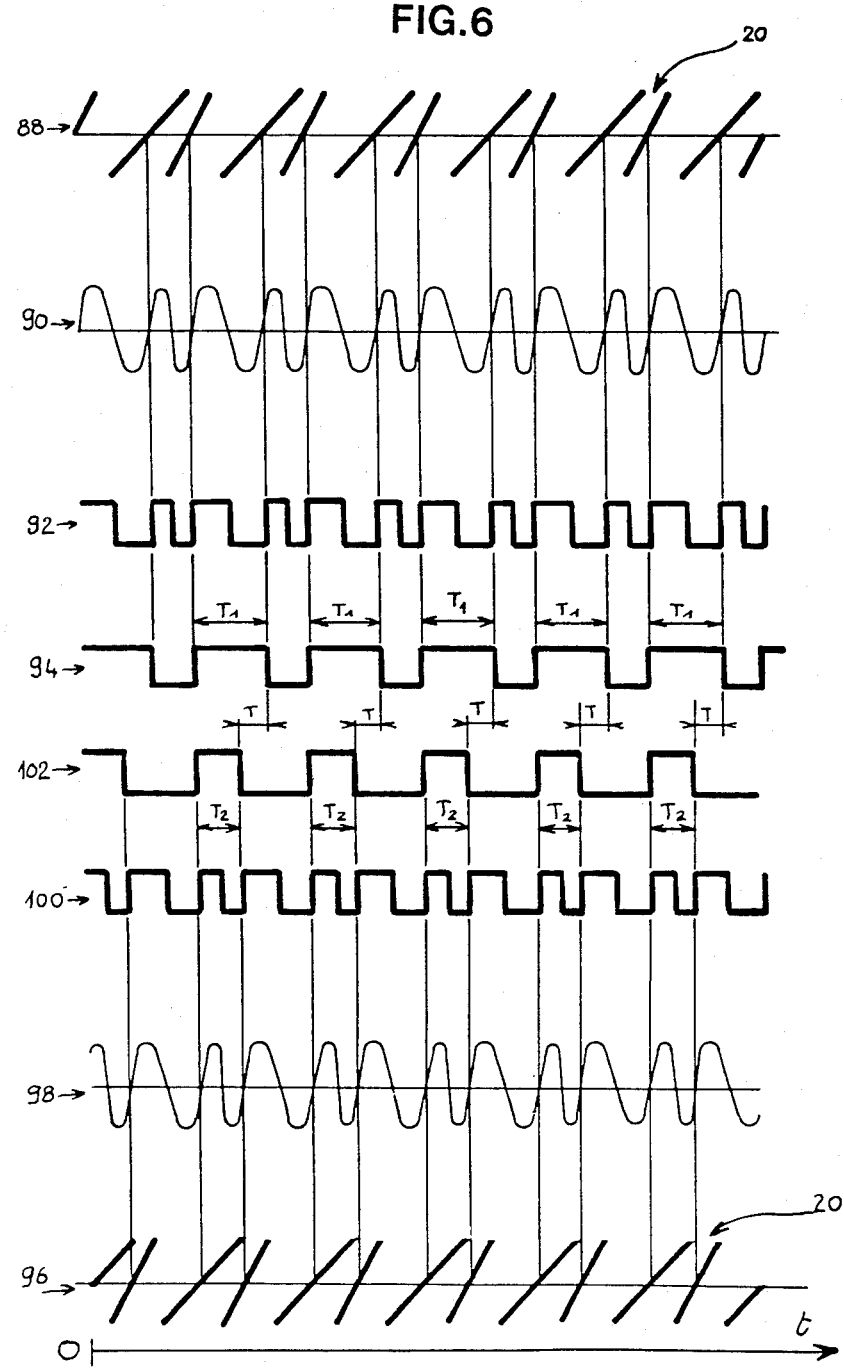

MASS FLOWMETER

BACKGROUND OF THE INVENTION

1. Field of the Invention

This invention relates to an apparatus for measuring the mass rate of flow of fluids.

2. Description of the Related Art

Many apparatus already exist for measuring mass flow on the basis of different principles: densimetric correction, gyroscopic correction, Coriolis effect, etc. One of these apparatus which is currently used comprises two rotors connected to each other through a resilient member such as a spring. Such an apparatus is described for example in U.S. Pat. No. 2,943,487. The torsion angle of the two rotors, i.e. the phase shift between the first rotor and the second rotor, is proportional to the kinetic energy of the fluid, i.e. to the product of the density d of the fluid multiplied by the square of the rate of flow v of the fluid. In addition, the rotary speed of the rotor is proportional to the rate of flow v of the fluid. It is noted that by taking the ratio between the phase-shift angle of the two rotors, proportional to $dv^2$, and the rotary speed v of the rotor, one obtains a quantity which is proportional to the product of the density of the fluid d multiplied by the speed v of the flowing fluid, i.e. proportional to the mass flow $d \cdot v$ of the fluid. In practice, the time interval corresponding to the phase-shift angle of the two rotors is measured. This type of flowmeter has numerous embodiments, one of which is described for example in U.S. Pat. No. 3,604,265.

In another type of mass flowmeter, use is made of two rotors mounted coaxially in the conduit traversed by the fluid. The two rotors can rotate independently of each other. The first rotor is used to give the fluid a rotational movement with respect to the conduit axis. The rotating fluid then creates a torque on the second rotor. This torque, which is proportional to the mass flow, is measured. An embodiment of a flowmeter of this type is described in U.S. Pat. No. 3,555,900.

It is moreover known that measuring the flow rate of a fluid by means of a turbine-type apparatus does not provide sufficient accuracy unless the flow of fluid within the meter takes place under turbulent conditions. Flow in the conduit is initially laminar for low speeds and then becomes turbulent as of a speed defined by the Reynolds formula. In order to broaden the measurement range with turbine-type flowmeters, an effort was made to modify the type of flow at low speed, i.e. to make it turbulent even for low flow rates. For this purpose, French Pat. No. 1 286 833 proposed a turbine-type flowmeter having either several propellers whose blades have different inclinations from one propeller to another, or a single propeller whose blades have at least two different inclinations, so as to communicate to the fluid the nonrectilinear trajectories which favor the establishment of turbulent flow.

Mass flowmeters with two turbines have the drawback of including many moving parts. There is in fact a risk of jamming of certain parts due to wear and to corrosion by the fluid. In addition, the inertia of the system increases as the number of moving parts increases. The result is a greater difficulty in measuring pulsed flows.

SUMMARY OF THE INVENTION

It is an object of the present invention to provide a mass flowmeter using a small number of moving parts so as to make it reliable, rugged and economical. Whereas prior-art mass flowmeters use two turbines, the meter according to the present invention uses only one turbine which can rotate freely around its axis of rotation without any constraint. The rotor blades of this single turbine have two outstanding features. Firstly, they can deflect elastically under the action of the fluid going through the turbine and, secondly, they have different angles of inclination.

More precisely, the invention relates to an apparatus for measuring the mass flow of a fluid and comprising a conduit adapted to be traversed by the fluid, characterized in that it includes a turbine comprising a bladed rotor mounted in the conduit to be rotated by the fluid, at least one of the rotor blades being elastically deformable under the action of the flowing fluid and the angles of inclination of the blades with respect to the turbine axis being different for at least two blades, and means for measuring a characteristic parameter of blade deformation between at least two blades having different angles of inclination and at least one of which is elastically deformable, said parameter being representative of the mass flow of the fluid.

Advantageously, all the blades are elastically deformable and the even-row blades have a certain angle of inclination whereas the odd-row blades have another angle of inclination.

BRIEF DESCRIPTION OF THE DRAWINGS

The invention will be better understood from the following description of an embodiment given by way of nonlimitative example with reference to the accompanying drawings in which:

FIG. 6 is a diagram showing the principle of the measurements and the waveform of the different signals of the measurement circuit.

DESCRIPTION OF THE PREFERRED EMBODIMENT

Figure 1:
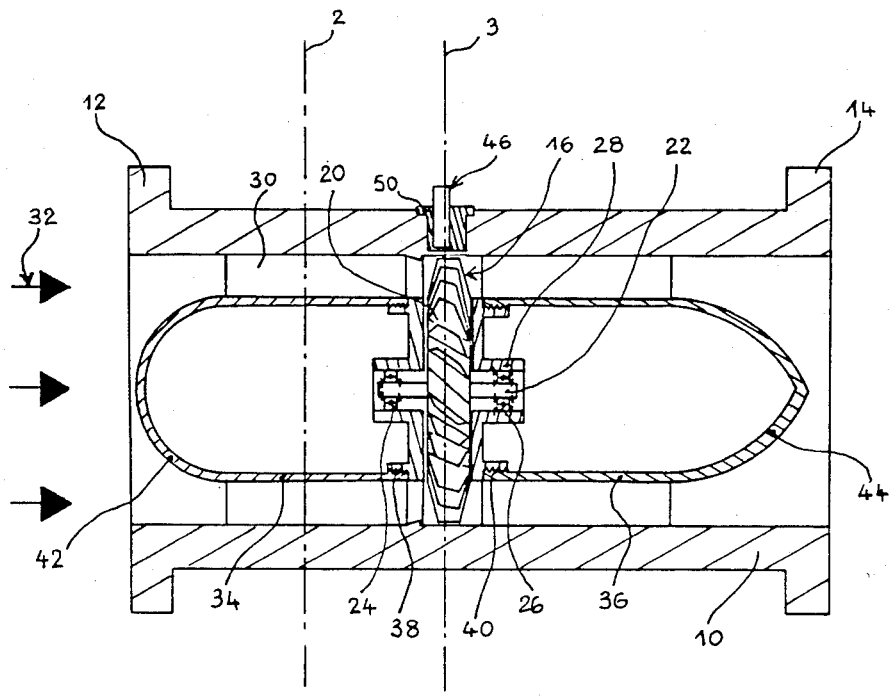
FIG. 1 represents schematically a mass flowmeter according to the present invention.
Figures 2, 3:
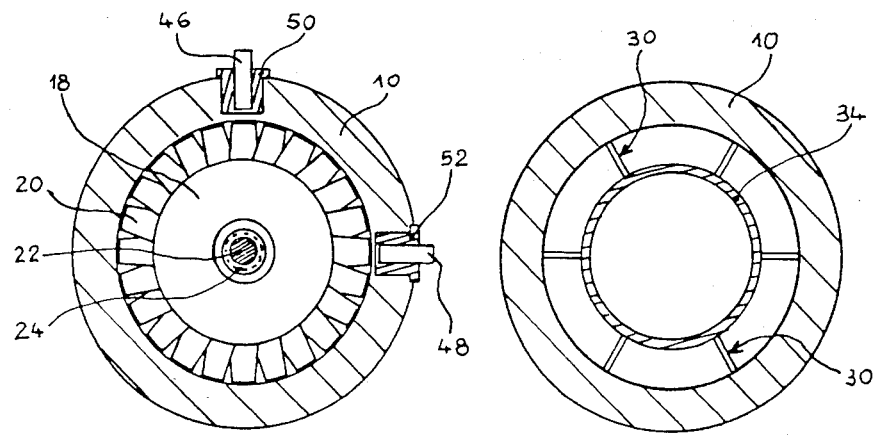
FIG. 2 is a cross-section of the mass flowmeter of FIG. 1 along the plane 2.
FIG. 3 is a cross-section of the mass flowmeter represented in FIG. 1 along the plane 3.

The preferred embodiment of the mass flowmeter according to the invention is shown in FIG. 1. It includes a housing 10 of tubular form whose two ends comprise flanges 12 and 14 allowing the mass flowmeter to be attached between two ends of the conduit in which flows the fluid whose rate is to be measured. The flowmeter includes a single turbine 16 placed coaxially in the center of the housing 10. The turbine diameter is slightly smaller than the inner diameter of the housing. The turbine 16 includes (see also FIG. 3) a rotor 18 equipped with blades 20 and rotating around a shaft 22. This shaft is supported by and rotates within two ball bearings 24 and 26 which are fixed inside a frame 28. Antivortex vanes 30 (see FIG. 2) are provided radially in a ring in the housing 10. These antivortex vanes are designed to channel the fluid within the housing 10, the fluid entering into the conduit in the direction indicated by the arrows 32 so as to channel the fluid onto the blades 20 of the turbine and prevent vortex formation. These antivortex vanes are also designed to center the turbine 16 and constitute supports for two hollow sleeves 34 and 36 of the same diameter as the solid part of the rotor 18 and placed opposite the front face and the rear face of this rotor. The frame 28 supporting the turbine 16 is screwed onto the sleeves 34 and 36, as shown at 38 and 40. The sleeve 34 is terminated at the front of the turbine by a faired nose or bullet 42 and the sleeve 36 is terminated at the back of the turbine by a bullet 44. These bullets are designed to direct the fluid so as not to disturb its flow. Two identical magnetic detectors 46 and 48 are placed opposite and over the blades 20 of the turbine within eccentrics 50 and 52 (see FIG. 3). The eccentrics 50 and 52 are placed in recesses pierced in the housing 10. The detectors are placed so that when one of them is opposite an even-row blade the other is opposite an odd-row blade. The eccentrics are used as will be explained below to position each of the detectors so as to obtain the zero of the measurement for a 360-degree rotation of the turbine and for a zero mass flow. Each magnetic detector is composed classically of a permanent magnet around which is wound a solenoid whose two ends are connected to a resistor. The blades are made of magnetic material, the result being that with each passage of a blade near the detector there is a voltage pulse at the terminals of the resistor due to the variation in magnetic permeability.

The rotor blades 20 of the turbine 16 are placed in a ring around the solid part 18 of the rotor. These blades are placed in the annular space delimited by the internal wall of the housing 10 and by the sleeves 34 and 36. According to one of the characteristics of the invention, the blades are made of magnetic material capable of deforming elastically under the action of the fluid going through the blades and the flow rate of which is to be measured. In the embodiment represented, the blades are made of steel of the type generally used for spring manufacture. The thickness of the blades is such that the blades can deflect under the action of the flowing fluid for flow rates within the measurement range of the meter. As an example, a thickness of 0.5 mm is suitable when the fluid is a liquid. To avoid exceeding the elastic limit of the blades, means such as stops may be provided to limit the bending of the blades.

Figure 4:
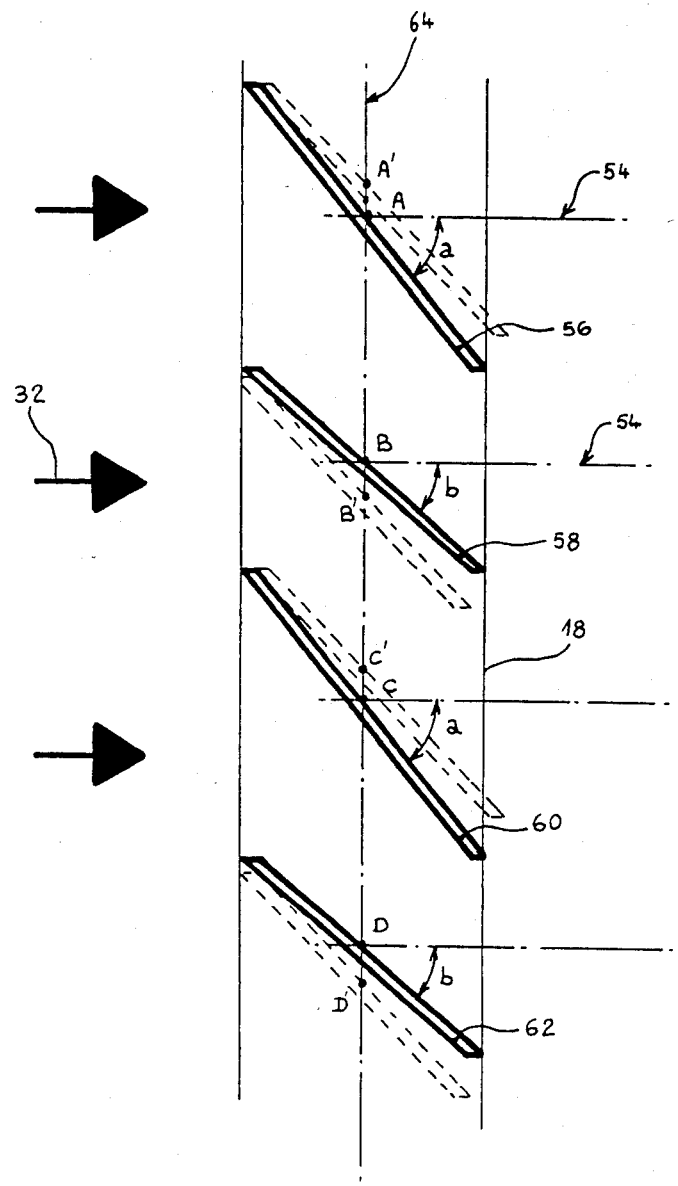
FIG. 4 represents schematically, in a top view, part of the rotor unrolled along a given plane.

According to another characteristic of the invention, the angle of inclination of the blades with respect to the axis of the turbine is variable. In FIG. 4, which represents a top view of part of the blades along one of the diameters of the turbine, with the rotor having been unrolled flat, the solid part of the rotor is indicated by the reference 18 and the axis of the turbine by the reference 54. Four blades 56, 58, 60 and 62 are represented. The inclination of the blades 56 and 60 is indicated by the angle a and the inclination of the blades 58 and 62 by the angle b.

According to a preferred embodiment of the invention, there is an even number of blades, the even-row blades having the same angle of inclination a and the odd-row blades having the same angle of inclination b. Thus, two successive blades have different angles of inclination. In the embodiment represented, the angles of inclination alternate from blade to blade and have values of 40 and 50 degrees. There are 20 of these blades. Preferably, the sum of the angles of inclination of two successive blades is between 50 and 110 degrees and one of the angles is at least 20 degrees. Also preferably, the half-sum of the angles of inclination of the two blades having different inclinations is equal to 45 degrees. This value is in fact a function of the flows to be measured. It is however to be noted that the turbine may have any number of blades, but at least two, and that at least one of the blades must be elastically deformable. In the latter case, the two blades will have different angles of inclination. Furthermore, only two blades should have different inclinations and at least one of them should be elastically deformable even if the turbine has more than two blades. It can also be seen that blades of different inclination are not necessarily adjacent. In the represented embodiment, the blades are flat. In the case of blades having a non-flat shape, helical for example, the angle of inclination to be considered is the average angle of each blade.

The principle of mass flow measurement with the flowmeter of the present invention is explained below with reference to FIG. 4. It is observed experimentally that the blades deflect under the action of the flowing fluid and that their deviation with respect to their rest position increases as the mass flow of the fluid increases. The relationship between the deflection of the blades and the mass flow is a linear relationship within a certain range of flows. Furthermore, it is noted that two blades of different inclination are deviated in opposite directions, either approaching each other or moving away from each other. Thus, in FIG. 4, dotted lines have been used to show the positions occupied by the end of the blades when they are deflected by the flow of fluid. When the turbine is at rest, the blades are equidistant, i.e. the distances AB, BC and CD are equal, these distances being marked along the median axis 64 of the blades perpendicular to the axis of the turbine. These distances change under the effect of the flowing fluid: distance AB increases to become equal to A′B′, distance BC decreases to become B′C′ and distance CD increases to become C′D′, and so on for the distances between successive blades not shown. The measurement of the variation in distance between at least two blades of different angles of inclination or a characteristic parameter of this distance variation provides an indication of the mass flow of the fluid going through the turbine. Thus, the variation in the distance AB is by itself sufficient to indicate the value of the mass flow. The same applies to the distance B′C′ which has varied from BC in the direction opposite the distance A′B′. By combining these two measurements, A′B′ and B′C′, a more sensitive and more accurate indication of the mass flow is obtained. To accomplish this, a characteristic parameter of the difference A′B′−B′C′ is measured. In the described embodiment, one measures the time intervals corresponding to the passage of two successive blades of different inclination in front of a magnetic detector.

The deflection of the blades under the effect of the flowing fluid has two origins. Firstly, it is known that for a constant fluid flow the rotational speed of the turbine increases with the angle of inclination of the blades. Thus, when this angle is zero, the rotational speed is zero and—at least in theory and for an ideal fluid—the speed of the turbine becomes infinite when the blade angle of inclination is 90 degrees. Blades with an angle of inclination a tend to turn the turbine at a given speed whereas blades having an angle of inclination b (b being greater than a) tend to turn the turbine at a higher speed. The result is that the turbine equilibrium rotational speed is an intermediate speed between these two values. By reaction, blades of inclination a then exert a driving torque on the turbine, and blades of inclination b exert a braking torque. These torques result in the deformation of the blades. Another phenomenon exists: the venturi effect. In fact, considering FIG. 4, it is noted that the passage section of the fluid between the blades 56 and 58 decreases from the inlet to the outlet. This results in a pressure which is exerted on the walls of the blades and which has a tendency to deform the blades to make the inlet and outlet passage sections the same. For the next two blades 58 and 60, it is the inlet section which is smaller than the outlet section. The venturi effect operates in the opposite direction and has a tendency to bring the blades 58 and 60 closer together. The two phenomena just described are combined and both tend to make the blades parallel. The extent of one of the phenomena with respect to the other depends on the nature of the fluid. Thus, the venturi effect is predominant when the fluid is a liquid. It will be noted that for these two phenomena, the greater the difference between the angles of inclination a and b, the greater the deformation of the blades.

The measurement principle with a single magnetic detector is the following: one measures the two time intervals corresponding to the passage of three successive blades before the detector.

Thus, referring to FIG. 4, the two intervals correspond to the passages of the points A'-B' and B'-C' respectively before the detector. In practice, the procedure is not limited to these two time intervals: a total is made of the time intervals corresponding to the differences A'-B', C'-D', etc., i.e. to the time intervals corresponding to the passages of even-row and odd-row blades in front of the detector, and a total is made of the time intervals B'-C', etc., corresponding to the passage of odd-row and even-row blades in front of the detector. These totals of the time intervals are carried out for a complete rotation of the turbine. This makes it possible to eliminate the blade deformations which are not due to the effect of the flowing fluid. In fact, the blades are assumed to be perfectly equidistant when the turbine is at rest. However, they are not always so owing to the varying precision of the manufacture of the rotor and the shocks which the blades may undergo. These mechanical deformations are however compensated for by a 360-degree rotation of the turbine. It is thus desirable to carry out a total of the different time intervals for a complete rotation of the turbine so as to overcome the effect of blade defects.

In the described embodiment, the mass flowmeter advantageously has two detectors, one being placed opposite one of the even-row blades and the other opposite one of the odd-row blades when the turbine is at rest. The use of two detectors makes it possible to overcome the effects of turbine speed variations during measurements. In fact, referring to FIG. 4, if the turbine speed drops during the measurement, the measured time interval corresponding to B'C' will be longer and, conversely, if the turbine speed increases, the measured time interval will be shorter. For these reasons, the two magnetic detectors are triggered at the same moment, for example when one of the even-row blades passes in front of the first detector and one of the odd-row blades passes in front of the second detector. Thus, referring to FIG. 4, the first detector will be located opposite the point A and the second detector will be opposite the point B and they will be triggered simultaneously.

Prior to any measurement, it is necessary to set the instrument to zero, i.e. the flowmeter indicates the zero value when the blades do not undergo any deformation. This is the case for example when the turbine is driven by a motor within an enclosure in which a vacuum has been provided or when the turbine is driven by a fluid of insufficient density to permit a measurement of blade deformation. If all the blades were perfectly equidistant from each other, which is not the case in practice, it would be sufficient to perfectly center the magnetic detectors along the median axis 64 (FIG. 4) perpendicular to the turbine axis. To overcome the imperfections of the rotor, each of the two magnetic detectors is adjusted individually by moving it by means of the eccentrics 50 and 52 along the axis of the turbine. The adjustment consists in finding a position of the detector for which the sum of the positioning errors cancel out for a 360-degree rotation of the rotor.

Figure 5:
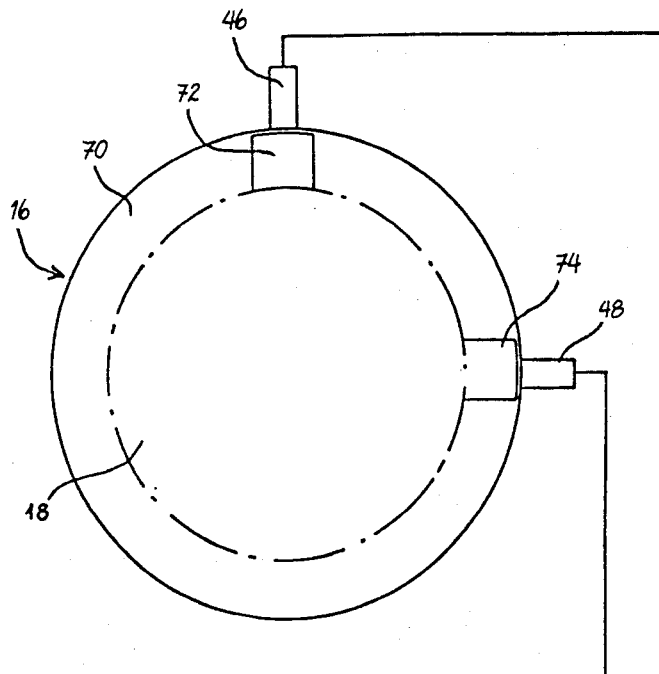
FIG. 5 represents schematically the electronic mass-flow measuring system.
Figure 5:
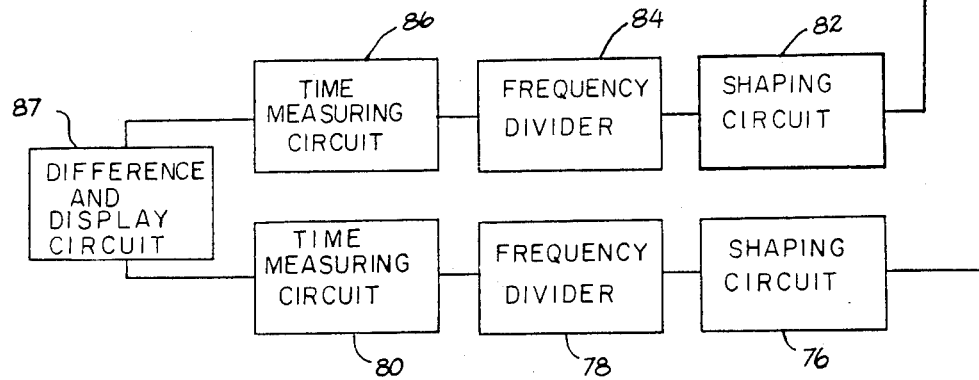

FIG. 5 is a schematic diagram of the measurement circuit. The turbine 16 is represented schematically by the rotor 18 circled by a ring 70 representing the space in which the blades 20 move. The two detectors 46 and 48 are located respectively opposite an even-row blade 72 and an odd-row blade 74. With the detector 46 is associated a shaping circuit 76 followed by a frequency divider 78. This divider is connected to the input of a time measurement circuit or chronometer 80. To the detector 48 is connected a shaping circuit 82 followed by a frequency divider 84 which is connected to the input of a time measurement circuit 86. A circuit 87 makes it possible to calculate and to display the difference in absolute value of the indications furnished by the chronometers 80 and 86. All these circuits are of conventional design and are commercially available.

FIG. 6 is a time diagram of the signals at the output of the different measurement circuits according to the position of the turbine blades 20 in relation to the detector. The axis Ot represents the time axis, O being the origin. The diagrams 88 and 96 represent the position of the rotor blades 20 in relation to the first and second magnetic detectors respectively when the blades are deformed under the action of the flowing fluid. At the time O, an even-row blade is opposite the first detector whereas an odd-row blade is opposite the second detector (or vice versa). The diagrams 90 and 98 represent the output signal delivered respectively by the first and second detectors. These signals have the shape of a frequency-modulated sinewave. In fact, the permeability variation is zero whenever the detector is opposite a blade or when the detector is located midway between two successive blades. Between these two positions, the permeability variation goes through a maximum or a minimum. The signals of the diagrams 92 and 100 are emitted by the shaping circuits 76 and 82 respectively. These circuits emit rectangular signals from the modulated sinusoidal signal. The important element of these shaping circuits is nothing other than a transistor which is blocked or released with each zero passage of the sinusoidal signal of the diagrams 90 and 98. The diagrams 94 and 102 represent the signals emitted by the frequency dividers 78 and 84 respectively. These dividers divide by two the frequency of the signals delivered by the shaping circuits. These frequency dividers generally consist of a flip-flop. The pulsewidths $T_1$ in diagram 94 correspond in fact to the distance between two successive blades, for example the distance between an even-row blade and a successive odd-row blade. In diagram 102, the pulsewidths $T_2$ correspond to the distance between two successive blades, between an odd-row blade and the successive even-row blade. The absolute value of the difference $T_1-T_2=T$ indeed corresponds to the difference between the distances A'B' and B'C' in FIG. 4. The chronometers 80 and 86 are triggered with each positive-going edge of the pulses of the diagrams 94 and 102 respectively and are stopped with each negative-going edge. The chronometer 80 thus measures the times $T_1$ and the chronometer 86 measures the times $T_2$. As mentioned earlier, a total is made (and if necessary the average is taken) of the time intervals $T_1$ and $T_2$ for a 360-degree rotation of the turbine in order to compensate for blade imperfections. The sum (or average) of the measurements $T_1$ and $T_2$ makes it possible to determine the sum (or average) of the absolute values $T_1-T_2=T$, which corresponds to the characteristic value of the mass flow sought. In FIG. 6, the time intervals T have been represented as being equal. The same is true as regards the time intervals $T_2$. This of course presupposes that the blades are perfectly equidistant and that the rotational speed of the turbine is uniform.

The advantage of using two synchronized detectors, one placed opposite an even-row blade and the other placed opposite an odd-row blade, appears clearly in diagrams 94 and 102. It is in fact noted that a variation in turbine speed during measurement results in variations in $T_1$ and $T_2$ in the same direction, which will be partially compensated by the difference $T_1-T_2$.

A particularly important application of the mass flowmeter just described is the measurement of the respective flow rates of each phase in a two-phase gas-liquid mixture. In fact, the determination of the volume and mass flow rates of the two-phase fluid enables the determination of the respective flow rates of gas and liquid, provided the densities of the liquid and the gas are known and that any required temperature and pressure corrections are made. Such a method is described for example in Russian Patent No. 189 170. Using the flowmeter of the invention, it is noted that the rotary speed of the turbine provides, in a conventional manner, a characteristic value of the volume flow rate of the fluid. The mass flow is obtained as indicated previously by measuring the blade deformations under the action of the flowing fluid. The same apparatus thus makes it possible to determine simultaneously the volume and mass flow rates of the fluid and, consequently, to determine the respective rates of flow of each phase of a two-phase liquid-gas mixture. For this particular application, the characteristics of the turbine may be the following: radius 100 mm, blade height 35 mm, annular fluid-passage section in flowmeter 180 cm$^2$, blade width 25 mm, blade thickness 0.5 mm (made of steel). For a fluid passage speed of 1 to 12 m/second in the flowmeter, the rotational speed of the rotor varies from about 2 to 20 rotations per second. The result is that the times $T_1$ and $T_2$ will vary from about 5 to 50 milliseconds and the difference $T=T_1-T_2$ varies between 0.1 and 1 millisecond.

The embodiment just described has of course been given as a nonlimitative example. It will be understood, for example, that other arrangements of the blade are possible and that the dimensions are given only as examples. Similarly, a measurement of $T_1$ or $T_2$ is sufficient for obtaining an indication of the mass flow rate of the fluid. The measurement of the difference $T_1-T_2=T$ is advantageous but not necessary. The angles of inclination of the blades may be modified without departing from the scope of the present invention. A single detector may be used. Other types of detectors, which are not magnetic, can be used, for example capacitive, optical, etc. detectors. The explanation given with respect to blade deformation under the effect of the flowing fluid corresponds to the perception of the phenomenon by the inventor. It is of course evident that this explanation is given only as a guide.

I claim:

1. Apparatus for measuring the mass rate of flow of a fluid, comprising a housing forming a conduit adapted to be traversed by the fluid; a turbine comprising a rotor with a plurality of blades mounted in the conduit to be rotated by the fluid, at least two of said blades having angles of inclination a and b with respect to the turbine axis which are different and at least one of said at least two blades being elastically deformable under the action of the flowing fluid; and means for measuring a characteristic parameter of blade deformation between said at least two blades, said parameter being representative of the mass flow rate of the fluid.

2. Apparatus according to claim 1, wherein said at least two blades having different angles of inclination a and b are two successive blades.

3. Apparatus according to claim 1, wherein said blades comprise a plurality of alternating even-row and odd-row blades spaced circumferentially about the rotor, with all even-row blades having the same angle of inclination a, all odd-row blades having the same different angle of inclination b, and with all of at least one of said even-row and odd-row blades being elastically deformable.

4. Apparatus according to either of claims 2 or 3, wherein the sum of the angles of inclination a and b of two successive blades having different angles of inclination is between 50 and 110 degrees.

5. Apparatus according to claim 4, wherein the half-sum of the angles of inclination a and b of two successive blades having different angles of inclination is equal to 45 degrees.

6. Apparatus according to claim 5, wherein one of the angles of inclination a and b is 40 degrees and the other is 50 degrees.

7. Apparatus according to claim 3, wherein the means for measuring a characteristic parameter of blade deformation comprises means for measuring a parameter representative of the distance between said at least two blades.

8. Apparatus according to claim 7, wherein said means for measuring a parameter representative of said distance comprises a detector located near the turbine rotor and serving to deliver a signal upon the passage of each blade near the detector, and time measurement means coupled to said detector for delivering a signal representative of the difference in absolute value between two time intervals corresponding respectively to the time for passage near said detector of two successive even-row and odd-row blades and the time for passage of two successive odd-row and even-row blades.

9. Apparatus according to claim 3, wherein said means for measuring a parameter characteristic of blade deformation includes means for measuring a parameter characteristic of the difference between the distance separating two successive even-row and odd-row blades and the distance separating two successive odd-row and even-row blades, said means comprising two detectors located near the rotor and placed so that the one detector is opposite an even-row blade when the other detector is opposite an odd-row blade, and time measurement means coupled to said detectors for delivering a signal representative of the difference in absolute value between a time interval corresponding to the time for passage near said one detector of two successive even-row and odd-row blades and a time interval corresponding to the time for passage near said other detector of two successive odd-row and even-row blades.

10. Apparatus according to claim 9, wherein all of the blades are elastically deformable, and wherein said time measurement means provides a first indication characteristic of the sum of the time intervals corresponding to the times for passage near said one detector of the successive even-row and odd-row blades for a 360-degree rotation of the rotor, a second indication characteristic of the sum of the time intervals corresponding to the times for passage near said other detector of the successive odd-row and even-row blades for a 360-degree rotation of the rotor, and a third indication representative of the difference in absolute value between said first and second indications.

11. Apparatus according to either of claims 8 or 9, wherein said detector(s) is (are) magnetic detector(s).

12. Apparatus according to claim 9, further comprising means for adjustably attaching the detectors to the housing to permit the relative positioning of the detectors with respect to the rotor blades.

13. Apparatus according to claim 3, wherein said elastically deformable blades are made of steel of a sufficiently small thickness to permit elastic deformation under the action of the flowing fluid.

14. A method of simultaneously determining the volume and mass flow rate of a fluid, usable for example in the determination of the respective rates of flow of each phase of a two phase gas-liquid mixture, comprising the steps of:
flowing the fluid through a conduit against a turbine comprising a bladed rotor mounted therein;
causing rotation of the rotor by the action of the fluid against at least two blades of said rotor having different angles of inclination a and b with respect to the turbine axis;
causing elastic deformation under the action of the flowing fluid of at least one of said at least two blades;
measuring a parameter representative of the rotational speed of the rotor to provide a characteristic value of the volume flow rate of the fluid; and
measuring the deformation between said at least two blades to provide a characteristic value of the mass flow rate of the fluid.

* * * * *